(12) United States Patent
Hammes et al.

(10) Patent No.: US 8,750,428 B2
(45) Date of Patent: Jun. 10, 2014

(54) METHOD FOR CHANNEL ESTIMATION WHEN USING DIFFERENT MODULATION METHODS WITHIN ONE SIGNAL INTERVAL

(75) Inventors: Markus Hammes, Dinkslaken (DE); André Neubauer, Krefeld (DE); Michael Speth, Krefeld (DE)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

(21) Appl. No.: 11/279,197

(22) Filed: Apr. 10, 2006

(65) Prior Publication Data

US 2006/0233285 A1     Oct. 19, 2006

Related U.S. Application Data

(63) Continuation of application No. PCT/DE2004/002292, filed on Oct. 15, 2004.

(30) Foreign Application Priority Data

Oct. 16, 2003     (DE) .................................. 103 48 205

(51) Int. Cl.
*H04L 27/08*     (2006.01)
(52) U.S. Cl.
USPC ............ 375/340; 375/137; 375/147; 375/260; 375/262; 375/265; 375/267; 375/343; 375/346; 375/347; 375/350
(58) Field of Classification Search
USPC ......... 375/340, 137, 147, 260, 262, 265, 267, 375/343, 346, 347, 350; 370/203, 204, 205, 370/208, 209, 210
See application file for complete search history.

(56) References Cited

U.S. PATENT DOCUMENTS

| | | | | |
|---|---|---|---|---|
| 6,269,131 B1 | 7/2001 | Gothe et al. | ................... | 375/346 |
| 6,304,618 B1 * | 10/2001 | Hafeez et al. | .................. | 375/341 |
| 6,901,120 B2 * | 5/2005 | Wilhelmsson | ................ | 375/342 |
| 2001/0022805 A1 | 9/2001 | Dabak et al. | ................... | 375/132 |
| 2002/0094041 A1 | 7/2002 | Kopmeiners et al. | ......... | 375/340 |
| 2002/0131486 A1 * | 9/2002 | Haartsen | ....................... | 375/229 |

FOREIGN PATENT DOCUMENTS

GB     2 354 676 A     3/2001     ............. H04L 25/03

OTHER PUBLICATIONS

Darwood, Alexander & Oppermann, "LMMSE Chip Equalisation for 3GPP WCDMA Downlink Receivers with Channel coding"; 2001 IEEE.*
International Search Report; PCTJDE2004/002292; 11 Pgs, Mar. 10, 2005.

(Continued)

*Primary Examiner* — Dhaval Patel
(74) *Attorney, Agent, or Firm* — Dicke, Billig & Czaja, PLLC

(57) ABSTRACT

The method is based on a signal interval (DB) which comprises a first part (ET) (which is modulated using a first modulation method (GFSK)) of the signal interval and a second part (which is modulated using a second modulation method (DMPSK)) of the signal interval. The channel parameters (c(i)) relating to the second part (which is modulated using the second modulation method) of the signal interval are determined using a received data signal (a(i); p(i)) from the first part (ET) of the signal interval (DB).

22 Claims, 2 Drawing Sheets

(56) References Cited

OTHER PUBLICATIONS

"Digital Cellular Telecommunications System (Phase 2+); Modulation (3GPP TS 45.004 version 5.1.0 Release 5); ETSI TS 145 004";
ETSI Standards, European Telecommunications Standards Institute, Sophia-Antipo, FR, vol. 3-G1, No. V510, 12 Pg, Jun. 2002.
Proakis, J.G.; "Digital Communications"; fourth edition, McGraw-Hill, chapter 11.1.2, pp. 663-666.

* cited by examiner

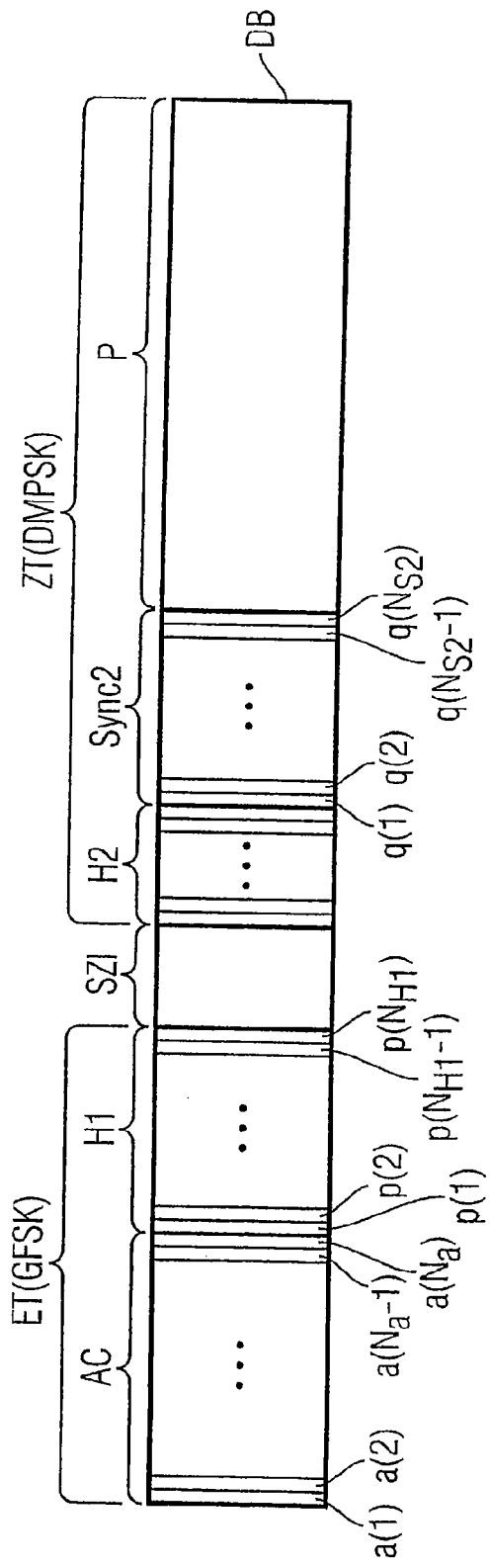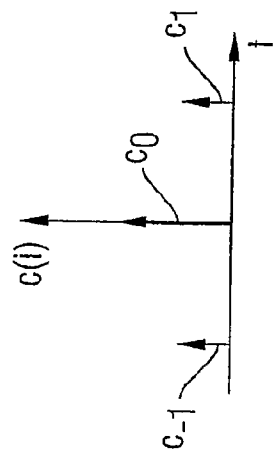

METHOD FOR CHANNEL ESTIMATION WHEN USING DIFFERENT MODULATION METHODS WITHIN ONE SIGNAL INTERVAL

CROSS-REFERENCE TO RELATED APPLICATION

This application is a continuation of co-pending International Application No. PCT/DE2004/002292 filed Oct. 15, 2004 which designates the United States, and claims priority to German application number DE 103 48 205.9 filed Oct. 16, 2003.

TECHNICAL FIELD

The invention relates to a method for determination of channel parameters in a mobile radio receiver relating to a second part of a signal interval, with the signal interval comprising a first part which is modulated using a first modulation method of the signal interval and the second part which is modulated using a second modulation method of the signal interval.

BACKGROUND

At present, in digital cordless communication systems which are based on the Bluetooth Standard Version 1.1, data is transmitted as standard at rates of 1 Mbit/s. In this case, a two-value GFSK modulation method (Gaussian Frequency Shift Keying) is used. The GFSK modulation method is a frequency-shift keying modulation method (FSK—Frequency Shift Keying). In the case of GFSK-based modulation, a Gaussian filter is also used at the transmission end, in order to limit the frequency bandwidth. A filter such as this results in pulse-shaping of the frequency and data pulses, with the pulse per symbol extending over a time of more than only the symbol time duration T.

One possible way to achieve higher data transmission rates is to use modulation methods with more values, such as the four-value DQPSK method (Differential Quadrature Phase Shift Keying) or, in general, the DMPSK method, in which an M-value symbol where M≥4 is transmitted instead of a two-value bit. For future versions of the Bluetooth Standard (possibly even from Version 1.2, but at the latest from Version 2.0), it is planned to increase the data rate using a modulation method with more values.

In order to achieve an increase in the data rate in later versions of a Standard for standardized digital radio transmission systems, it is worthwhile changing from a modulation method with a small number of values (for example GFSK) to a modulation method with more values (for example DQPSK) once the radio link has been in existence for a certain time. This allows backward compatibility of the new version of the Standard with the earlier versions of the Standard. Setting up a connection, or setting up a so-called piconetwork in the case of the Bluetooth Standard, can in this case first of all be carried out using the modulation method with a small number of values as used for all the appliances according to the Standard. If both of the appliances in a link or piconetwork that has been set up are designed for modulation with more values, this modulation can be used for the subsequent data transmission. In general, in digital TDMA (Time Division Multiple Access)-based mobile radio systems, the information is transmitted in the form of a data burst with a defined time. In the case of packet-oriented mobile radio systems, a data packet to be transmitted extends over one or more data bursts. A data burst comprises a first data burst header or data packet header. The header contains necessary information for addressing the remote end and for indication of the packet type, and should thus, for compatibility reasons, be transmitted using a modulation method with a small number of values, for all versions of the Standard. In particular, it is also feasible for the header to indicate to the respective remote end that it should switch to a second modulation method, with more values. Switching to a modulation method with more values then does not take place until a second part of the data burst. If a plurality of data packets are transmitted successively, the modulation method is thus switched alternately a plurality of times. For receiver-end recovery of the data that is modulated with more values in the second part of a burst, it is fundamentally possible because of the greater disturbance sensitivity involved with this to use methods which require channel estimation. The aim of channel estimation is to indicate channel parameters which describe the transmission behavior of the channel. In this case, the channel parameters include the influences of the air interface, which frequently has frequency selectivity and multipath propagation. Furthermore, it is possible to take account of the influences of transmission and/or receiving components in the channel estimation. These are frequently dependent on the modulation type being used. Furthermore, the channel parameters are also influenced by temperature effects, ageing or component tolerances of the analogue receiving components (front end).

For channel estimation, a received signal in a training sequence is generally compared with a reference signal which is known at the receiver end. The achievable estimation accuracy for channel estimation and thus also the performance of the receiver are generally increased with the number of known data elements.

Future versions of the Bluetooth Standard will provide a training sequence for channel estimation in the second part of a data burst, which is modulated with more values. However, the number of symbols in this training sequence is relatively small, so that the achievable estimation accuracy of the channel parameters determined on the basis of this training sequence may be inadequate.

SUMMARY

The invention is thus based on the object of specifying a method which works sufficiently accurately for determination of channel parameters which, once a modulation change has occurred within a signal interval, relate to a second part of the signal interval, which is modulated using a second modulation method.

The method according to the invention is in this case based on a signal interval comprising a first part (which is modulated using a first modulation method) of the signal interval and a second part (which is modulated using a second modulation method) of the signal interval. The channel parameters relating to the second part (which is modulated using the second modulation method) of the signal interval are determined, according to the invention, using a received data signal from the first part of the signal interval.

As is generally known, methods for channel estimation fundamentally operate with receiver-end reference data, which is compared with the received signal. The reference signal which is associated with the received data signal may represent data information which is already known in the receiver, in particular stored data information, or else information which is obtained by processing of the received signal. If reference information is determined without data information being known at the receiver end, then this is also referred to as so-called blind estimation or blind equalization. In this case, the reference signal is generally determined by means of detection (decision-directed) of the received signal.

The method according to the invention offers the advantage that it is possible to use a greater amount of reference data for the estimation method. Thus, in addition to the reference data in the second part of the signal interval, it is also possible to use reference data in the first part of the signal, and correlate this with the corresponding received signal. With the increase in the number of reference data items, the estimation accuracy for the channel parameters to be estimated increases. Furthermore, when exclusive use is made of a received data signal from the first signal interval for channel estimation, the method according to the invention makes it possible to provide the channel parameters at an earlier time so that they can be used earlier for data recovery than is the case when exclusively using a training sequence from the second part of the signal interval.

For the purposes of this application, channel parameters are not in this case understood as meaning only channel parameters in the relatively narrow sense, that is to say as parameters of a transfer function or impulse response to be estimated, and as the transfer function or impulse response itself, but also in the wider sense as parameters of a signal equalizer or input filter (matched filter). Since the object of such receiving components is to compensate for channel influences in the received signal, their parameters can in principle be determined from the channel parameters in the narrower sense, that is to say the impulse response of the channel.

Furthermore, the channel parameters can describe not only the essential influences of the air interface but also, optionally, the influences of one or more transmitting and/or receiving components.

The signal interval, which comprises a first part (which is modulated using a first modulation method) of the signal interval and a second part (which is modulated using a second modulation method) of the signal interval, advantageously corresponds to a data burst. In relatively recent versions of packet-oriented mobile radio standards, it is possible to modulate the information of a first header or access code for addressing and control of the remote end using the first modulation method, so that it is obtained in a form which is recoverable even by those receivers which are based on earlier versions of the Standard. A method which is used for such a data burst for determination of the channel parameters of the second part of the data burst offers the advantage that the channel parameters estimated in this way differ only slightly from the actual channel relationships, because of the short time difference between the occurrence of the data signal (first part of the burst) which determines the estimation and the time of use (second part of the burst) of the estimated channel parameters. If the time interval were longer, the discrepancies would also be greater, since the channel relationships vary continuously, especially in the case of channels with fast fading.

According to one advantageous embodiment, channel parameters relating to the first part of the data burst are determined first of all in a first step using a received data signal from the first part of the data burst. This is based on the assumption that these channel parameters which are determined in the first step describe only the modulation-independent part of the channel.

This measure makes it possible for the channel parameters which are determined in the subsequent step and relate to the second part of the data burst to be determined in a simple manner from the channel parameters relating to the first part.

If the channel parameters to be estimated relating to the second part of the data burst do not comprise the modulation-dependent components, then the sets of channel parameters correspond to one another. If the channel parameters to be estimated in the second part also describe the modulation-dependent components, the channel parameters to be estimated in the second part of the data burst can be determined by means of a simple convolution operation. For this purpose, the channel parameters determined in the first step are convolved with the impulse response of the modulation-dependent components of the second modulation method. It is advantageously possible to provide for the first part of the data burst to comprise an access code and a first header, and for the second part of the data burst to comprise a training sequence. This offers the capability to also use information in the form of a training sequence from the second part of the data burst, in addition to the information from the first part that is known at the receiver end, in order to estimate the channel parameters.

According to a first advantageous embodiment, the channel parameters relating to the first part of the data burst are estimated with the aid of an MMSE (Minimum Mean Square Error) estimation method, in particular with the aid of an MAP-LMMSE (MAP—Maximum a-Posteriori; LMMSE—Linear Minimum Mean Square Error) estimation method, using the received data signal from the reference information which is associated with the first part of the data burst and with this data signal. The data signal which is used may also in particular represent the access code or a part of the access code. In this case, it is advantageous for the reference information and/or as a function of this, a plurality of results of the computation operations of the MMSE and LMMSE estimation method to be or stored in the receiver in the factory.

The MMSE and LMMSE methods which are known to those skilled in the art are based on minimizing the mean square estimated error. The generic expression an MMSE estimator covers not only ML (maximum likelihood) estimators but also MAP estimators, in which case, in contrast to ML estimators, MAP estimators use so-called a-posteriori information, that is to say information which is known in advance, for example about the channel noise or the channel as such. In contrast to the MMSE method, a linear estimator is an essential precondition for the LMMSE method. Matrix operations, in particular matrix inversions and matrix multiplications, are carried out in MMSE or LMMSE methods for estimation of the channel parameters. One of the basic matrices is the autocorrelation matrix, whose elements are dependent on a standardized data sequence. In addition to the reference sequence, the autocorrelation matrix also represents reference information that is known at the receiver end, for the purposes of the invention. In order to reduce the computation complexity, the result of the matrix inversion of the autocorrelation matrix, the standardized data sequence or results of other computation operations which are dependent thereon may, for example, be stored in the channel estimator at this stage.

According to an alternative embodiment to this, the channel parameters relating to the first part of the data burst are estimated with the aid of an iterative LMS (Least Mean Square) estimation method, using the received data signal from the first part of the data burst and reference information which is associated with this data signal.

In principle, this offers the advantage that the estimation of the channel parameters can be carried out without matrix inversion. Since, for example, the information of the access code which can be used in the estimation method is normally available, in particular in the case of Bluetooth systems, only when the connection is set up, a matrix inversion of the autocorrelation matrix would have to be carried out during operation for non-iterative estimation methods. The channel parameters can be determined without matrix inversion with the aid of the iterative LMS method, which is known to those skilled in the art. Furthermore, iterative estimation methods such as the LMS method require considerably more reference information in order to achieve adequate estimation accuracy. The use of the bit sequence of the access code, which is longer than the header, is thus particularly suitable for use of the LMS method.

It is advantageously possible to provide for a modulation-dependent reference signal first of all to be determined as reference information for estimation of the channel parameters relating to the first part of the data burst. The modulation-dependent reference signal is in this case determined by pulse-shaping corresponding to the first modulation method of a modulation-independent reference sequence.

In principle, as mentioned above, the channel parameters can describe not only the essential influences of the air interface but also, optionally, influences of one or more transmitting and/or receiving components. Of the optional influences, transmission-end pulse-shaping which is dependent on the modulation method should be mentioned in particular. In order to determine the channel parameters relating to the second part (which is modulated using the second modulation method) of the data burst, the channel parameters relating to the first part (which is modulated using the first modulation method) of the data burst are first determined. In this case, these initially determined channel parameters describe only the modulation-independent part of the channel. The above procedure makes it possible to directly calculate the channel parameters relating to the first part without the influence of the modulation, that is to say without the influence of the modulation-dependent pulse-shaping. In this case, a modulation-independent reference sequence, that is to say a discrete-value symbol sequence, is converted to a modulation-dependent reference sequence, that is to say to a pulse-modulated symbol sequence. There is therefore no need to calculate the modulation-dependent part of the channel parameters from the channel parameters relating to the first part.

According to a further advantageous embodiment, additional channel parameters relating to the second part (which is modulated using the second modulation method) of the data burst are, furthermore, determined using a received data signal from the training sequence and reference information which is associated with this data signal. In this case, it is advantageous for the channel parameters relating to the second part of the data burst to be determined using the additional channel parameters.

A procedure such as this makes it possible to further improve the accuracy of the channel estimate. In a case such as this, the channel estimate is not just dependent on the first part of the data burst.

In this case, the channel parameters relating to the second part of the data burst are preferably determined as a function of a selection variable, which is dependent on the respective connection,
a) as resultant channel parameters relating to the first part of the data burst which are obtained from the transmission-end pulse-shaping using the second modulation method of the determined channel parameters relating to the first part of the data burst, or
b) as additional channel parameters relating to the second part of the data burst, with these channel parameters taking account of the transmission-end pulse-shaping in the second modulation method, or
c) as averaging of the individual resultant channel parameters and of the individual additional channel parameters, in which case these take account of the transmission-end pulse-shaping in the second modulation method.

This offers the advantage that the channel estimate can be flexibly matched to different transmission conditions. It is known that the quality of the channel estimators a) and b) is dependent on the transmission conditions. If the estimate a) based on the first part of the data burst is better, then this is used exclusively for indication of the channel parameters.

If, in contrast, the estimate b) based on the second part of the data burst is better, then only these results are used for channel estimation. If the quality of the two estimators a) and b) is comparable, then the quality of the estimate can be improved further by averaging the results of the two estimators.

According to one advantageous embodiment, the first modulation method describes GFSK modulation, and the second modulation method describes DMPSK modulation where M≥4. In this case, the modulation index of the GFSK modulation is advantageously determined, and then represents the selection variable which is dependent on the respective connection.

This extension to the method takes account of the influence of the modulation index of the GFSK modulation on the quality of the channel estimate relating to the second part of the data burst. This therefore makes it possible to determine the channel parameters to be estimated for the second part of the data burst optimally and sufficiently accurately despite the modulation index having a particularly poor value.

BRIEF DESCRIPTION OF THE DRAWINGS

The invention will be explained in more detail in the following text using one exemplary embodiment and with reference to the drawings, in which:

FIG. 1 shows an illustration of the structure of a data burst;

FIG. 2 shows an illustration of the impulse response $c(i)$ of the channel;

DETAILED DESCRIPTION

Figure 3A:
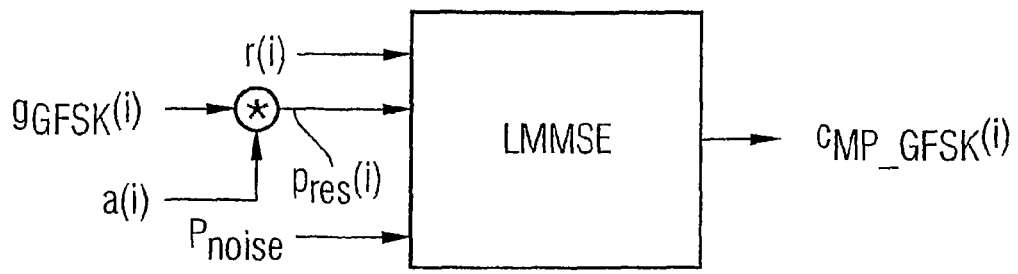
FIG. 3a shows an illustration of one implementation of the estimation of channel parameters $c_{GFSK}(i)$ relating to the first part of the data burst with the aid of the LMMSE method.

FIG. 1 shows a structure of a data burst DB interchanged between the subscribers in an already set-up piconetwork by radio in a Bluetooth transmission system based on a Bluetooth Standard higher than 1.1.

The data burst DB or the data packet in FIG. 1 comprises a first part ET, which has an access code AC arranged at the start with the symbol sequence $\{a(1), a(2), \ldots, a(N_a-1), a(N_a)\}$ and a first header H1 following this with the symbol sequence $\{p(1), p(2), \ldots, p(N_{H1}-1), p(N_{H1})\}$. A guard time interval SZI is optionally adjacent the header H1 of the first part ET. The data burst DB furthermore comprises a second part ZT, which follows the guard time interval SZI. The second part ZT has a second data burst header or a second header H2, followed by a training sequence Sync2 with the symbol sequence $\{q(1), q(2), \ldots, q(N_{S2}-1), \ldots q(N_{S2})\}$. This training sequence is followed by the payload data area P of the second part ZT.

At the start of the transmission of the data packet or data burst DB, the first part ET which is modulated using a two-value GFSK modulation method is transmitted at a first data rate by the transmitting radio unit, and is received by a remote station. The first data rate, as the Bluetooth Standard data rate, is 1 Mbit/s. On a standard-specific basis, identification and synchronization information is transmitted at the start of the first part ET by means of the access code AC of the piconetwork, followed by the first data burst header H1. The access code is known once the piconetwork has been set up. The header H1, as a further component of the first part of the burst, may include not only addressing information and details relating to the packet type used but also information about a second data rate at which the second part ZT of the data burst DB, which follows the first part ET, is intended to be transmitted. The second part ZT is transmitted at a higher data rate than the first part ET. In the exemplary embodiment, the second part ZT of the data burst DB is transmitted using a second modulation method, which is based on DMPSK modulation where M≥4. In the case of DQPSK modulation with four-value symbols, the second part ZT of the burst is transmitted at twice the data rate of a transmission based on GFSK modulation. No data is transmitted during the optional time period of the guard time interval SZI. The guard time interval SZI is used for modulation-dependent component switching at the transmission and reception ends.

If both appliances in the radio link support the increased data rate based on DMPSK modulation, switching from the first modulation method to the second modulation method can take place in each burst. In this case, the check for support of the increased data rate is actually carried out while the piconetwork is being set up.

For reception-end recovery of the data (payload) which is contained in the second part of the data burst DB, it is generally necessary to know the transmission response of the channel for DMPSK modulation. In this case, in particular, the transmission-end pulse-shaping, which is selected depending on the modulation method, has a different effect on the transmission response of the overall channel—comprising the air interface, transmitter and receiver.

The modulation-dependent pulse-shaping can be characterized by a linear pulse $g_{Modulation}(i)$. In the case of Gaussian pulse-shaping, the pulse extends over a time of more than just the symbol time duration T. As part of the channel, the air interface generally has the response of a multipath channel, that is to say the transmitted signal reaches the receiver via a plurality of paths delayed in time with respect to one another. The transmission response of a multipath channel such as this can be characterized by its impulse response $c_{MP}(i)$. In this case, the impulse response $c_{MP}(i)$ can describe not only the air interface but also further parts of the channel, in particular the reception filters.

The impulse response of the resultant channel which comprises both the multipath channel and the transmission-end pulse-shaping is given by:

$$c(i) = g_{Modulation}(i) * c_{MP}(i) \quad (1).$$

FIG. 2 shows an example of the profile of the impulse response of the resultant channel with L=3 coefficients. In this case, the channel is described by a model with three coefficients, where $$c_i = c(i) \text{ where } i = -1, 0, 1 \quad (2).$$

The received signal r(i) is given by $$r(i) = s(i) * c(i) + n(i) = \sum_{k=-(L-1)/2}^{(L-1)/2} s(i-k) \cdot c(k) + n(i), \quad (3)$$

where s(i) denotes the transmitted signal, n(i) the noise signal with a noise power $P_{noise}$ and "*" the convolution operator.

The most obvious approach for estimation of the channel parameters c(i) relating to the second part of the burst is to use the known training data q(1), q(2), ..., q($N_{S2}$−1), Q($N_{S2}$) in the sequence Sync2 of the second part ZT of the burst for channel estimation. However, the number of these training data items is relatively small. For this reason, it is not possible to achieve very good accuracy with a channel estimation process such as this, which is based solely on the above training data as reference information that is known at the receiving end.

According to the invention, the channel parameters c(i) relating to that part of the data burst DB which is modulated using DMPSK are determined using the received data from the first part of the burst. For this purpose, in this exemplary embodiment, the channel parameters $c_{MP\_GFSK}(i)$ relating to the first part ET are determined first of all, in which case these channel parameters describe only the modulation-independent part of the channel.

FIG. 3a shows one implementation of the estimation of the channel parameters $c_{MP\_GFSK}(i)$ relating to the first part with the aid of the LMMSE (Linear Minimum Mean Square Error) method based on minimizing the mean square estimation error. The received data signal r(i) from one part of the access code AC and the reference sequence a(i) associated with this data signal are used as input variables for estimation. Furthermore, the pulse $g_{GFSK}(i)$ which describes the pulse-shaping must be known in order to estimate $c_{MP\_GFSK}(i)$. Furthermore, the estimate can optionally be improved by inclusion of the measured noise power $P_{noise}$.

Chapters 5.2.2 and 5.2.3, pages 197 to 206, of the textbook Analyse und Entwurf digitaler Mobilfunksysteme, P. Jung, Teubner-Verlag, 1997 [Analysis and design of digital mobile radio systems] describe the computation steps for determination of the channel impulse response. These details are hereby incorporated by reference in the disclosure content of this document.

In general, the vector of the coefficients of a sought impulse response $\underline{c}$ can be determined to be:

$$\underline{c} = (c_{-(L-1)/2} \ldots c_0 \ldots c_{(L-1)/2})^T = \underline{M} \cdot \underline{r} \quad (4),$$

where $\underline{M}$ describes the estimation matrix and $\underline{r} = (r_{a(min)} r_{a(min+1)} \cdots r_{a(max)})^T$ describes the vector of the received signal with respect to a reference sequence a(i). In this case, only one part of the access code is considered.

One requirement of an MMSE estimator is that the square of the estimated error is a minimum. One suitable possible estimation matrix may be defined on the basis of this requirement as:

$$\underline{M} = (\underline{R}^{-1} \cdot \underline{P})^{*T} \quad (5),$$

where $\underline{R}$ describes the autocorrelation matrix of the received training sequence and $\underline{P}$ describes the cross-correlation matrix between the received training sequence and the impulse response of the channel. The autocorrelation matrix $\underline{R}$ is a function of the training sequence being used, of the channel noise and of the correlation characteristics of the impulse response to be estimated. In the definition of the autocorrelation matrix $\underline{R}$ the channel noise and the correlation characteristics of the impulse response to be estimated are used only optionally in order to improve the estimate. This optional information represents a-priori estimation information. The use of a-priori estimation information therefore represents an MAP estimator, in particular an MAP-LMMSE estimator as a result of the use of a linear estimator. The cross-correlation matrix $\underline{P}$ is a function of the training sequence and of the correlation characteristics of the impulse response to be estimated.

In the case of the estimator illustrated in FIG. 3a, resultant reference information $p_{res}(i)$ in the form $$p_{res}(i)=g_{GFSK}(i)*a(i) \quad (6)$$

is used as reference information. This offers the advantage that the channel estimate as shown in FIG. 3a does not define the channel parameters for the channel including GFSK pulse-shaping, but only the channel parameters $c_{MP\_GFSK}(i)$ without GFSK pulse-shaping. The estimation matrix, the autocorrelation matrix and the cross-correlation matrix are in this case determined analogously to equation (5). Instead of using a convolution operation, the same result can also be obtained by filtering as appropriate for the convolution. This applies in principle to all convolution operations cited in this application.

Sequence $\{a(min), \ldots, a(max)\}$ is a sub-sequence of the access code, which comprises 68 bits, and is known once a connection has been set up in a Bluetooth-specific piconetwork. A synchronization sequence with a length of 64 bits is determined as part of the access code as a function of the so-called network-specific LAP address, and is described in Section 13.2.1, pages 142 to 145 of the Bluetooth Specification 1.1. In this case, depending on the value of one specific bit in the LAP address, the synchronization sequence has a first or a second Standard-specific bit sequence, with a length of 6 bits, at the end of the synchronization sequence. Furthermore, depending on the same bits in the LAP address, a first or a second Standard-specific bit sequence with a length of 4 bits is defined at the end of the access code, the so-called trailer bits. The sequence $\{a(min), \ldots, a(max)\}$ which is used for MAP-LMMSE estimation corresponds to the cohesive sequence of 11 bits of the access code which results from this, with two permutations of the sequence $\{a(min), \ldots, a(max)\}$ being possible depending on the value of the specific bit in the LAP address. The two permutations of both the inverted autocorrelation matrices $\overline{R}$ and cross-correlation matrices $\overline{P}$ which correspond to the sequence, or the two estimation matrices $\overline{M}$, directly, can be stored in the memory in the receiver at the factory. In this case, a specific value is assumed for the noise power $P_{noise}$, and corresponds to the minimum value to be expected of the noise power $P_{noise}$. Furthermore, it is also possible to store other results calculated in advance. Depending on which permutation of the reference sequence actually occurs, one of the two inverted autocorrelation matrices $\overline{R}$ and one of the two cross-correlation matrices $\overline{P}$ or estimation matrices $\overline{M}$ in each case are selected for estimation.

Figure 3B:
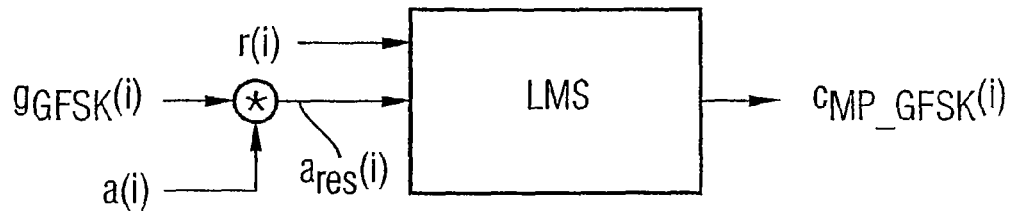
FIG. 3b shows an illustration of an alternative implementation of the estimation of channel parameters $c_{GFSK}(i)$ relating to the first part of the data burst with the aid of the LMS method.

FIG. 3b shows an alternative implementation of the estimation of the channel parameters $c_{MP\_GFSK}(i)$ relating to the first part with the aid of the iterative LMS (Least Mean Square) method based on minimizing the mean square estimation error. The received data signal r(i) from the entire access code AC and the reference information a(i) associated with this data signal are used as input variables for estimation. Furthermore, it is necessary to know the pulse $g_{GFSK}(i)$ which describes the pulse-shaping in order to estimate $c_{MP\_GFSK}(i)$.

In this case, analogously to the MAP-LMMSE estimator, the resultant reference information $a_{res}(i)$ based on $$a_{res}(i)=g_{GFSK}(i)*a(i) \quad (7)$$

is used as reference information for the LMS channel estimate.

The entire sequence of the access code a(i) is known once the piconetwork has been set up. Since the number of permutations of a reference sequence based on the entire access code is very large, all of the computation operations in the estimation process must also be carried out in the receiver without being able to access previously calculated values.

As already mentioned, only a part of the access code with a size of 11 bits can be used for the MAP-LMMSE estimate when it is intended to use stored values for the matrices used for the estimation method.

The known iterative LMS method may, however, be used to estimate the channel parameters without matrix inversion, so that the entire access code AC can be used as reference information for the estimation method, with little computation complexity. In this case, of course, it would also be feasible to use only a part of the entire access code for estimation. In the LMS method, as in the case of the MAP-LMMSE estimation method, the square of the error is minimized. The LMS method operates on the basis of an iterative gradient method (method of the steepest descent), with the minimum square error being reached after a total number n of iterations. The associated channel parameters then correspond to the estimation result. The LMS method is described in detail in Chapter 11.1.2, pages 663 to 666 of the textbook Digital Communications, J. G. Proakis, Fourth Edition, McGraw-Hill and is hereby included by reference in the disclosure content of this document.

Additional channel parameters $c_{DMPSK}(i)$ relating to the DMPSK-modulated second part ZT of the data burst can optionally be determined in addition to the estimation of the channel parameters $c_{MP\_GFSK}(i)$ relating to the GFSK-modulated first part on the basis of the alternative embodiments shown in FIG. 3a or FIG. 3b. In this case, the additional channel parameters $c_{DMPSK}(i)$ are determined using a received data signal from the training sequence Sync2 in the second part of the burst, and a reference sequence q(i) which is associated with this data signal. This reference sequence has a length of 10 training symbols in the case of the Bluetooth Standard. With DQPSK modulation, this corresponds to a length of 20 bits. Since the entire estimation method has the aim of determination of the channel parameters c(i) relating to the DMPSK-modulated part including the DMPSK-specific transmission-end pulse-shaping, it is worthwhile for the additional channel parameters $c_{DMPSK}(i)$ to also describe the DMPSK-specific pulse-shaping of the transmission end. The additional channel parameters $c_{DMPSK}(i)$ can be determined using an LMMSE or LMS method corresponding to that shown in FIG. 3a or 3b, respectively. In this case, however, there is no need to produce a resultant reference signal by means of the convolution operation; the reference sequence $\{q(1) \ldots q(N)\}$ in this case forms the input signal for the LMMSE or LMS operation.

Figure 4:
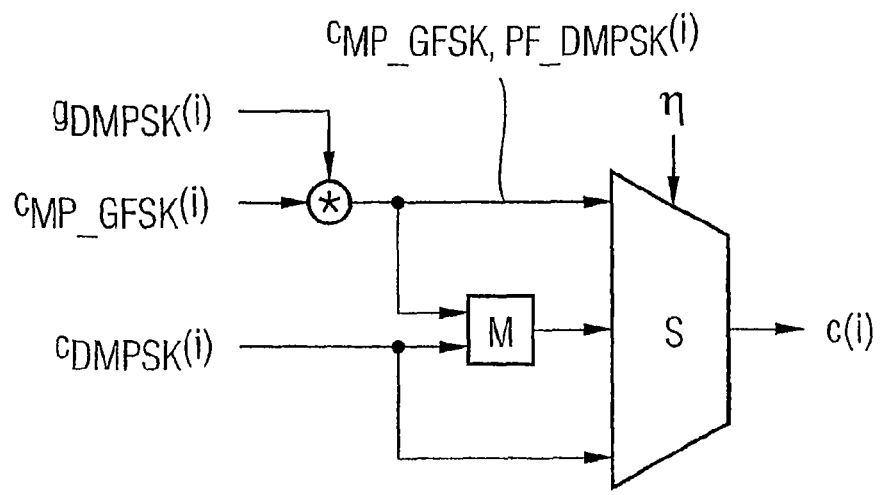
FIG. 4 shows an illustration of the determination of the channel parameters $c(i)$ as a function of the modulation index $\eta$.

FIG. 4 illustrates the determination of the channel parameters c(i) from the previously described estimation results $c_{MP\_GFSK}(i)$ and $c_{DMPSK}(i)$. The channel parameters $c_{MP\_GFSK}(i)$ relating to the GFSK-modulated first part of the data burst, which were determined using one of the methods illustrated in FIG. 3a or FIG. 3b, are first of all convolved with the pulse $g_{DMPSK}(i)$ of the pulse-shaping used for the DMPSK modulation. In contrast to the pulse of the GFSK modulation, this pulse is a so-called Nyquist pulse. The convolution result $c_{MP\_GFSK\_PF\_DMPSK}(i)$ forms a selection option of a subsequent 3-to-1 selection operation S for indication of the sought channel parameters c(i). Furthermore, the additional channel parameters $c_{DMPSK}(i)$ relating to the DMPSK-modulated second part ZT represent a further selection option. The third selection option is obtained as an average M of the channel responses $c_{MP\_GFSK\_PF\_DMPSK}(i)$ and $c_{DMPSK}(i)$. In this case, the 3-to-1 selection S is controlled via the modulation index η, which is known by measurement.

The reason for choice of channel estimation for indication of the sought estimation result is that the quality of the channel parameters $c_{MP\_GFSK}(i)$ based on the first part ET of the data burst is dependent on the modulation index $\eta$ of the GFSK modulation for the respective connection. The modulation index may fluctuate within a certain tolerance interval. It is known that estimation based on the GFSK-modulated part may become very poor for certain values of the modulation index. This is because the correlation characteristics of the respectively used resultant reference sequence change as a function of $\eta$. In a situation such as this, only the channel parameters $c_{CMPSK}(i)$ are used for indication of the sought channel parameters $c(i)$. For certain other values of the modulation index $\eta$, the estimation accuracy based on the first part of the data burst is very good, so that, in this case, an appropriate choice allows the channel parameters $c_{MP\_GFSK,PF\_DMPSK}(i)$ to be equated to the sought channel parameters $c(i)$. If the accuracy of the channel parameters $c_{CMPSK}(i)$ and $c_{MP\_GFSK,PF\_DMPSK}(i)$ is comparable, averaging M of the parameter sets can be carried out. This measure results in the averaged estimation result having a narrower fluctuation width than the individual parameter sets so that, on average, the sought estimation result $c(i)$ is more accurate.

Finally, it should be noted that it is also possible within the scope of the invention to take account in the determination of the channel parameters of changes in the transmission characteristic of the reception signal path in the receiver front end, which occur when switching between the various modulation methods, owing to the use of different receiver modules in the reception signal path. If the respective transmission characteristics of the reception signal path in the receiver front end are known, these can be used in an analogous manner to the modulation-dependent pulse-shaping for calculation of the channel parameters relating to the second part which is modulated using the DMPSK modulation method of the data burst.

What is claimed is:

1. A method for determination of channel parameters in a mobile radio receiver relating to a second part of a signal interval, with the signal interval comprising a first part which is modulated using a first modulation method and a second part which is modulated using a second modulation method, with the first part and the second part being filtered using different pulse shapes, the method comprising:
   estimating channel parameters relating to the first part of the signal interval from the first part of the signal interval, and
   determining the channel parameters relating to the second part of the signal interval from the channel parameters relating to the first part of the signal interval, further comprising:
   applying the pulse-shape of the first part of the signal interval to determine the channel parameters relating to the second part of the signal interval independent of the modulation-dependent pulse shaping of the first part, and
   using the pulse-shape of the second part of the signal interval to determine the channel parameters relating to the second part of the signal interval from the channel parameters relating to the first part of the signal interval.

2. The method according to claim 1, wherein the signal interval corresponds to a data burst.

3. The method according to claim 2, wherein the first part of the data burst comprises an access code and a first header, and the second part of the data burst comprises a training sequence.

4. The method according to claim 3, wherein the channel parameters relating to the first part of the data burst are estimated by a MMSE estimation method using the received data signal from the first part of the data burst and reference information which is associated with this data signal.

5. The method according to claim 3, wherein the channel parameters relating to the first part of the data burst are estimated by a MAP-LMMSE estimation method using the received data signal from the first part of the data burst and reference information which is associated with this data signal.

6. The method according to claim 4, wherein the reference information and/or, depending on this, a plurality of results of the computation operations of the MMSE estimation method are stored in the receiver at a factory.

7. The method according to claim 5, wherein the reference information and/or, depending on this, a plurality of results of the computation operations of the LMMSE estimation method are stored in the receiver at a factory.

8. The method according to claim 3, wherein the channel parameters relating to the first part of the data burst are estimated with the aid of an iterative LMS estimation method using the received data signal from the first part of the data burst and reference information which is associated with this data signal.

9. The method according to claim 4, further comprising:
   determining a modulation-dependent reference signal as reference information by pulse-shaping of a modulation-independent reference sequence using the first modulation method.

10. The method according to claim 3, further comprising:
    determining additional channel parameters relating to the second part of the data burst which is modulated using the second modulation method from the training sequence of the received data signal and reference information which is associated with this data signal.

11. The method according to claim 10, wherein the determination of the channel parameters relating to the second part of the data burst is carried out using the additional channel parameters.

12. The method according to claim 11, wherein the channel parameters relating to the second part of the data burst are determined as a function of a selection variable, which is dependent on the respective connection,
    as resultant channel parameters relating to the first part of the data burst which are obtained from a transmission-end pulse-shaping using the second modulation method of the determined channel parameters relating to the first part of the data burst, or
    as additional channel parameters relating to the second part of the data burst, with these additional channel parameters taking account of the transmission-end pulse-shaping in the second modulation method, or
    as averaging of the individual resultant channel parameters and of the individual additional channel parameters, in which case these take account of the transmission-end pulse-shaping in the second modulation method.

13. The method according to claim 1, wherein the first modulation method is GFSK modulation, and the second modulation method is DMPSK modulation with $M \geq 4$.

14. The method according to claim 12, wherein the method comprises:
    determination of a modulation index of a GFSK modulation, wherein the selection variable is the modulation index.

15. The method according to claim 1, wherein the method is used in a Bluetooth transmission system based on a Bluetooth Standard Version 1.2 or higher.

16. A method for determination of channel parameters in a mobile radio receiver relating to a second part of a data burst, with the data burst comprising a first part which is modulated using a first modulation method and a second part which is modulated using a second modulation method, the method comprising:
- determining a modulation-dependent reference signal by pulse-shaping of a modulation-independent reference sequence using the first modulation method,
- determining channel parameters relating to the first part of the data burst from the received data signal of the first part of the data burst and from the modulation-dependent reference signal, with these channel parameters describing only the modulation-independent part of the channel, and
- determining the channel parameters relating to the second part of the data burst from the channel parameters relating to the first part of the data burst and from the pulse shape of the second part of the signal interval.

17. The method according to claim 16, wherein the first part of the data burst comprises an access code and a first header, and the second part of the data burst comprises a training sequence.

18. The method according to claim 17, wherein the channel parameters relating to the first part of the data burst are estimated with the aid of an MMSE estimation method using the received data signal from the first part of the data burst and reference information which is associated with this data signal.

19. A method for determination of channel parameters in a mobile radio receiver relating to a second part of a signal interval, with the signal interval having a first part which is modulated using a first modulation method of the signal interval and a second part which is modulated using a second modulation method of the signal interval, the method comprising:
- estimating channel parameters relating to the first part of the signal interval from the first part and by applying the pulse-shape of the first part so that the estimated channel parameters relating to the first part of the signal interval only describe the modulation-independent part of the channel, and
- estimating the channel parameters relating to the second part of the signal interval which is modulated using the second modulation method from the estimated channel parameters relating to the first part of the signal interval and by using the modulation-dependent pulse-shape of the second part of the signal interval.

20. The method according to claim 1, wherein the channel parameters relating to the second part of the signal interval also describe the modulation-dependent part of the channel.

21. The method according to claim 19, wherein estimating the channel parameters relating to the first part of the signal interval comprises
- convoluting or filtering a modulation-independent reference sequence associated with the first part of the signal interval by a pulse shape of the first modulation method to generate a modulation-dependent reference signal, and
- estimating the channel parameters relating to the first part of the signal interval from the first part and the modulation-dependent reference signal.

22. The method according to claim 19, wherein estimating the channel parameters relating to the second part of the signal interval comprises
- convoluting or filtering the channel parameters relating to the first part of the signal interval by a pulse shape of the second modulation method.

* * * * *

UNITED STATES PATENT AND TRADEMARK OFFICE
CERTIFICATE OF CORRECTION

PATENT NO. : 8,750,428 B2  
APPLICATION NO. : 11/279197  
DATED : June 10, 2014  
INVENTOR(S) : Markus Hammes et al.

Page 1 of 1

It is certified that error appears in the above-identified patent and that said Letters Patent is hereby corrected as shown below:

On the Title Page

Item (75) Inventors: delete "Markus Hammes, Dinkslaken (DE)" and insert in place thereof --Markus Hammes, Dinslaken (DE)--.

Item (56) References Cited: delete "International Search Report; PCTJDE2004/002292" and insert in place thereof --International Search Report; PCT/DE2004/002292--.

Signed and Sealed this  
Third Day of February, 2015

Michelle K. Lee  
*Deputy Director of the United States Patent and Trademark Office*